J. H. BUCKLEY.
SHOCK ABSORBER.
APPLICATION FILED SEPT. 10, 1914.

1,282,374.

Patented Oct. 22, 1918.
3 SHEETS—SHEET 1.

WITNESSES:
Arthur Trezise, Jr.
James G. Bethell.

John H. Buckley
INVENTOR

BY L. H. Campbell
ATTORNEY

J. H. BUCKLEY.
SHOCK ABSORBER.
APPLICATION FILED SEPT. 10, 1914.
1,282,374. Patented Oct. 22, 1918.

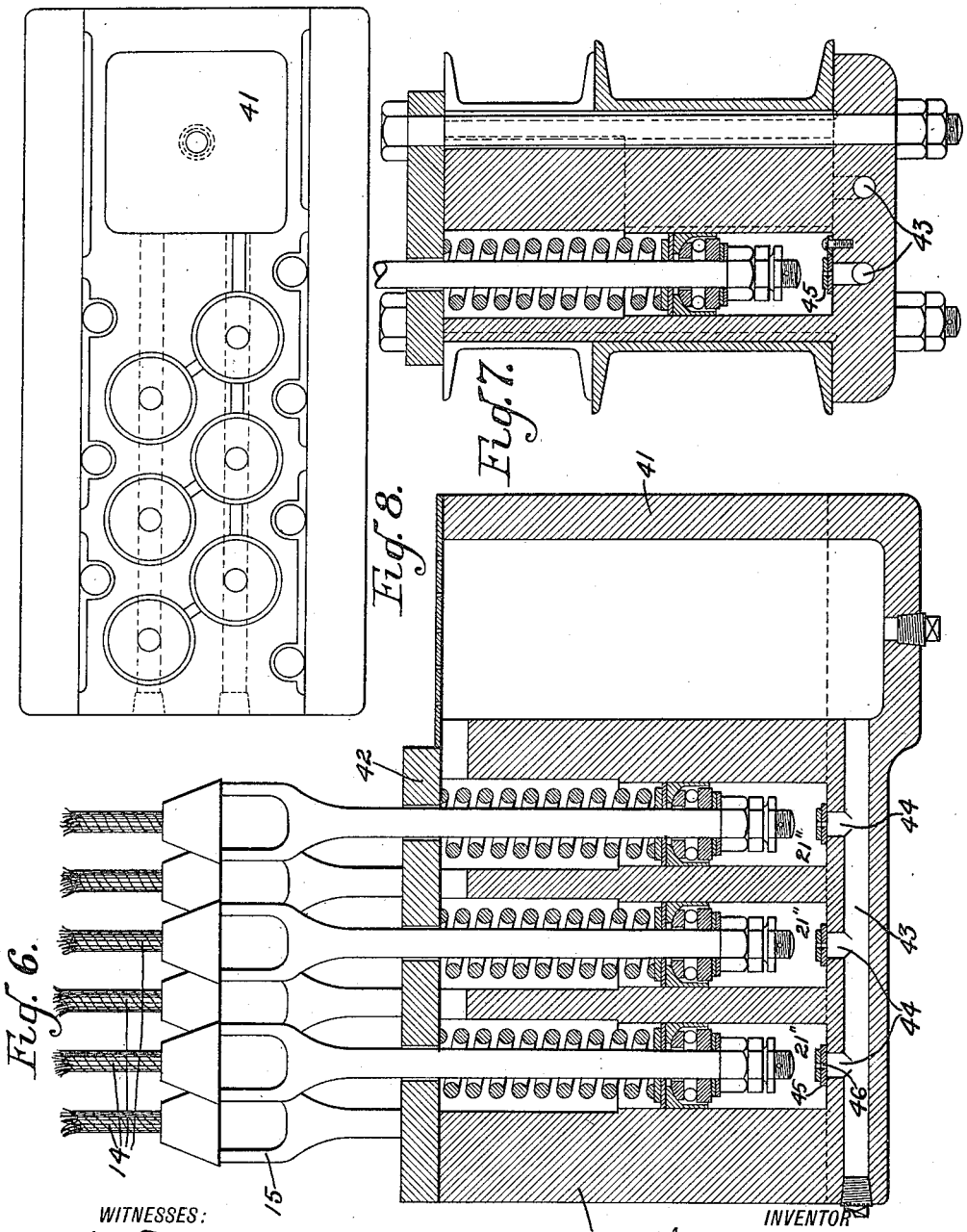

UNITED STATES PATENT OFFICE.

JOHN H. BUCKLEY, OF YONKERS, NEW YORK.

SHOCK-ABSORBER.

1,282,374.   Specification of Letters Patent.   Patented Oct. 22, 1918.

Application filed September 10, 1914. Serial No. 861,016.

*To all whom it may concern:*

Be it known that I, JOHN H. BUCKLEY, a citizen of the United States, residing in Yonkers, in the county of Westchester and State of New York, have invented a new and useful Improvement in Shock-Absorbers, of which the following is a specification.

One of the objects of the invention is to provide a device for use in passenger carrying devices such as elevators embodying a yielding supporting connection, together with mechanism for controlling the action thereof so as to check or absorb the recoil action set up therein.

In the various types of passenger carrying devices, it is a common practice to provide some sort of a yielding supporting connection for the purpose of preventing shocks and jars. Take for example in the case of elevators, a yielding connection is provided between the car and hoisting cables, such connection comprising generally heavy coil springs which serve to effectually prevent such shocks and jars. Now it has been found that the recoil action set up in these connections causes rebounding or teetering of the car which of course causes discomfort to the passengers in the car. To this end I have provided a device of an improved construction for the purpose of checking or absorbing the recoil action of such devices.

Other objects of the invention will appear hereinafter, the novel combinations of elements being set forth in the appended claims.

Figure 9:
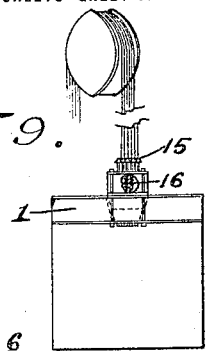
Figure 1:
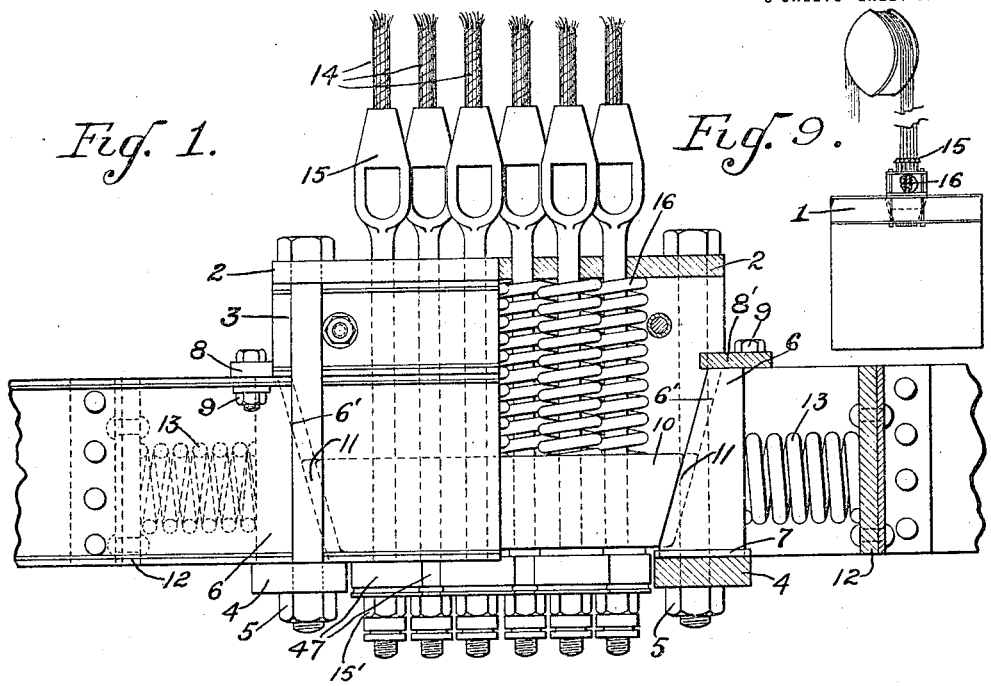
Figure 2:
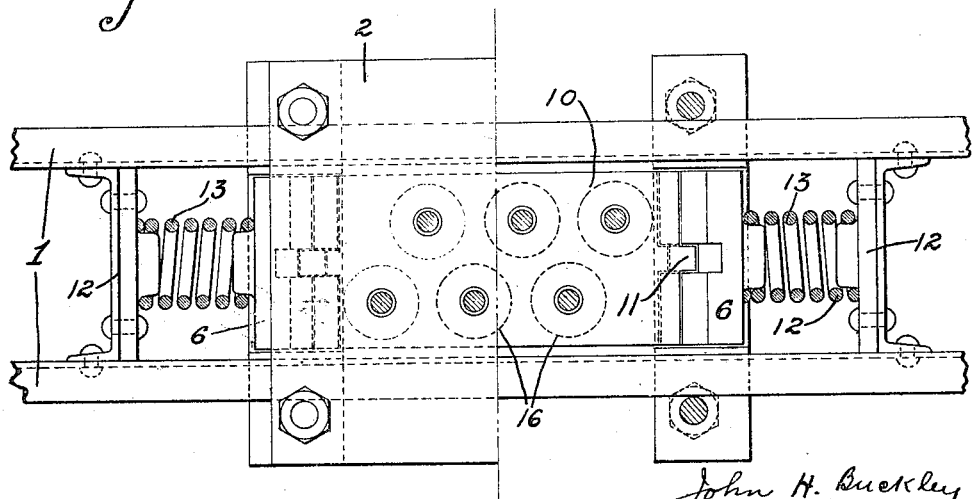
Figures 3, 4:
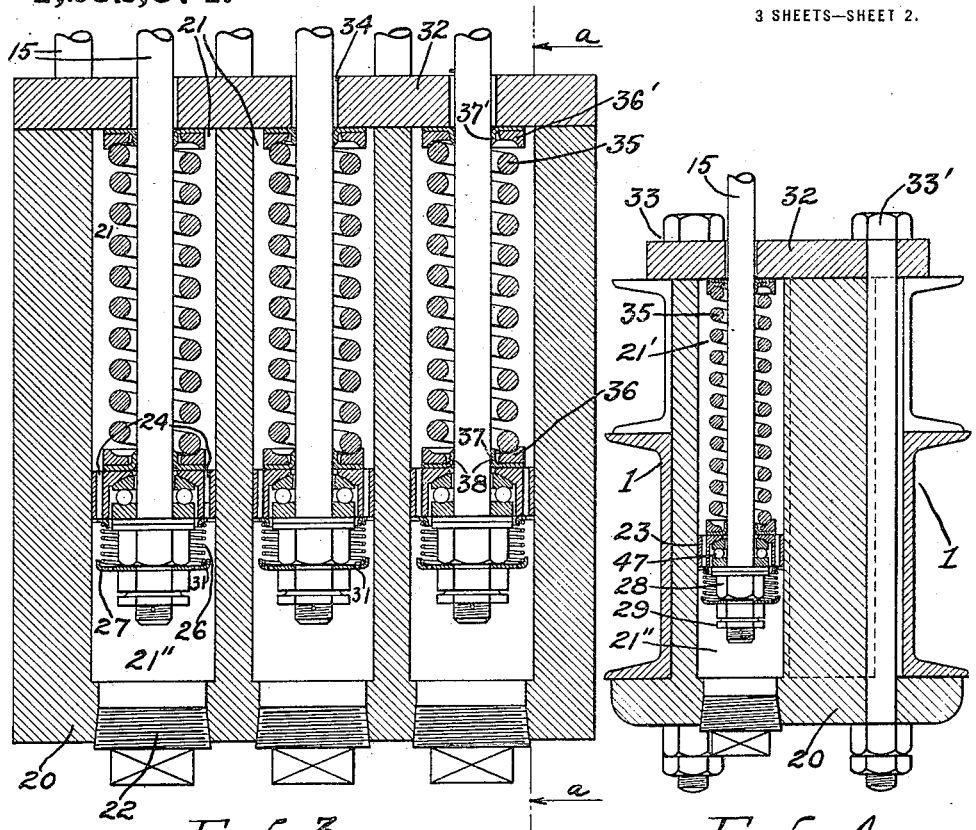
Figure 5:
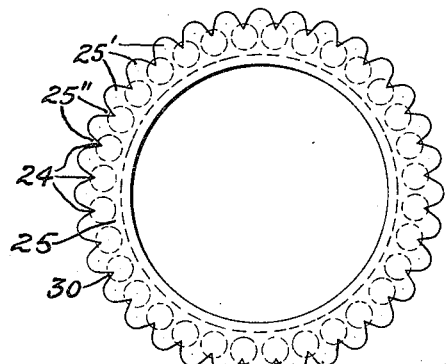

Referring to the drawings, Figure 1 is an elevational view partly in section of a shock absorbing device constructed in accordance with my invention, the same in this instance being arranged more particularly in the form of a cable hitch for the hoisting cables of an elevator; Fig. 2 is a plan view of Fig. 1; Fig. 3 shows a sectional elevational view of a modified construction; Fig. 4 is an end view of Fig. 3; taken on the line *a—a;* Fig. 5 shows in detail certain of the parts shown in Fig. 3; Fig. 6 is a sectional elevational view of another modified construction; Fig. 7 shows in section an end view of Fig. 6; Fig. 8 is a plan view of Fig. 6; Fig. 9 is a diagrammatic view illustrating an application of my invention to an elevator car.

Referring to Figs. 1 and 2, draw bars forming a support for an elevator car, comprise the channel beams 1, 1, which extend across the top of the car and are connected thereto in the usual manner by rivets or bolts. A top plate 2 is seated on additional short length channel beams 3, 3, and is held in fixed position by means of the bottom plates 4, 4, and the bolt and nut connections 5, 5. Blocks 6, 6, are slidably supported on the bottom plates 4, 4, these blocks being positioned between the channels 1, 1, and guided in their movements by means of the shoulders 7, 7, provided on the plates 4, 4. The blocks at their upper ends bear against plates 8, 8', which are secured to the channel beams 1, 1, by the bolt and nut connection 9. 9. These blocks are provided with oppositely directed inclines 6', 6', between which is positioned a wedge 10, which is preferably provided with projecting tongues 11, 11, engaging grooves in the inclines to hold and guide the wedge in its movements. Positioned between blocks 6, 6, and plates 12, 12, which are suitably secured to the channels 1, 1, are coil springs 13, 13 which urge the blocks 6, 6, against the wedge 10. Now in the way of providing a yielding connection between the car and hoisting ropes or cables 14, of which there may be one or a number, I connect to the end of each cable and in the usual manner, a thimble rod 15, these rods being provided with nuts 15', which seat roller bearings 47, which in turn seat the wedge 10. Springs 16 are carried on the rods 15 between the top plate 2 and the wedge 10, so as to support the weight of the car. The roller bearings 47 are provided for the purpose of relieving the twisting tension of the cables, thus avoiding twisting and untwisting of the same. These roller bearings are of a well known construction and a detail description thereof is thought unnecessary.

Now as is well known, the springs 16 effectively prevent any shocks or jerky movements of the elevator car, particularly at starting and stopping, but it will readily be seen that the recoil action of the springs, without some provision being made for locking the same, will cause teetering or rebounding of the car. Taking for example in the case of the elevator car starting upwardly, a pull is exerted by the cables, which by reason of their connection with the wedge 10 moves the same upwardly against the action of the springs 16, thus compressing the same. At the same time the springs 13 force the blocks 6 inwardly, thereby keeping their inclines in frictional engagement with the wedge. Now it will be seen that the recoil action of the springs 16 is checked or absorbed by the strong frictional resistance afforded by the spring pressed blocks 6 and the wedge 10, which frictional resistance retards the movement of the latter to its normal position. In this manner it will now be seen that the objectionable teetering or rebounding of the elevator car will be eliminated. The action of the device, upon bringing a descending car to a stop is the same as just described.

In the modified constructions shown in the remaining figures, the draw bars forming the support for the elevator car are substantially the same as the ones heretofore described, and need no further description. Referring now more particularly to Figs. 3 and 4, a hitch block 20 is positioned between the channels 1, 1, and is provided with a flanged bottom adapted to seat the said channels. The hitch block is provided with a number of bores 21, which are closed at the bottom by suitable screw plugs such as 22. Extending into these bores are the thimble rods 15 to the upper ends of which are connected in any suitable manner, the ropes or cables 14. Mounted on these rods near their lower end is a piston 23, said pistons fitting the bores snugly, and forming upper chambers 21', and lower chambers 21'' in the bores, said chambers being filled with fluid, preferably oil. Roller bearings 47 are provided for the purpose heretofore explained, these bearings in this instance forming a part of the piston, and being held on the rods by means of a nut 28 and lock nut 29. In the way of providing passages for communicating fluid between the chambers 21', 21'', I provide in the pistons a series of openings, such as 24, see Fig. 5. These passages are controlled by means of a check valve such as 25, which is normally seated against the bottom of the piston by means of a spring 26, which spring is seated by a flanged metallic plate 27 held firmly against rotation by the nuts 28 and 29. The valve 25 is in the form of a metallic disk, provided with a series of tongues 25' which at their outside diameters fit the bore snugly. The interdental spaces 25'' formed between these tongues are adapted to match the openings 24 in the piston, and are made of such a depth as to leave exposed only a comparatively small area of the said openings as indicated at 30 in Figs. 3 and 5. In order to prevent rotary motion of the disk 25, which might tend to move the interdental spaces out of proper relation with the openings or passages 24 in the piston, I suitably connect the ends of the spring 26 to the plate 27 and disk 25, respectively. A cover plate 32 is provided for the hitch block, said plate being of a width sufficient to span the oppositely disposed channels (see Fig. 4) and suspending the hitch block by means of bolts and nuts 33, 33'. The cover plate is provided with suitable openings 34, to allow for free movement of the thimble rods 15. Mounted on each one of the thimble rods is a coil spring 35, the lower end of which is seated by a spring seat 36, and the upper end likewise being seated by a spring seat 36'. Packings 37 and 37' are provided for the rods, the same being interposed between the spring seat 36 and the top side of the piston, and also between the underside of the cover 32 and the spring seat 36'. It will be seen that the openings 38 in the spring seats 36, 36' are made of sufficient size as to allow a small space around the neck portion of the packing. With the provision of this space around the neck of the packings, it will be seen that the pressure of fluid will at all times act to keep the packing in firm engagement with the rod, and also compensate for wear of the said packing. The springs 16 carried by the thimble rods are made of such strength as to be only partially compressed under any ordinary condition of operation. These springs act in the same manner as heretofore mentioned to prevent jerky movement of the car, particularly at starting and stopping. Now in the operation of the modified arrangement, the car in starting upwardly, moves the thimble rods together with the piston in the said up direction, thus compressing the springs 16. Such movement of the pistons compresses the fluid in the upper chambers 21' which fluid surges or in other words is forced through openings 24 in the pistons, thus forcing the check valves 25 away from the said openings, to permit free passage therethrough of the fluid from the upper chamber 21' to the lower chamber 21''. Now so soon as the upward movement of the pistons cease, the check valves 25 are again forced into their initial position by the recoil action of the springs 16. The passages 24 now being restricted, permits this recoil action of the springs 16 to move the pistons downwardly to their normal position very slowly or with a retarded movement, and in this manner it will be seen that the recoil of the springs is effectually checked, and the objectionable teetering, rebounding, etc., of the elevator car is eliminated. The action of the hydraulic device when the car is being brought to a stop is similar to that just described. It is to be understood that the dimensions of the interdental spaces in the check valves 18 may be varied as desired to suit conditions and loads.

The modified construction shown in Fig. 6 has certain features of construction which are in general similar to those shown in the former figures just described, and the main differences being in the rearrangement of the check valve mechanism and fluid system. In this figure a pot or casing 41 forms an integral part of the hitch block 20, said pot being provided with a suitable cover plate, such as 42. This pot is adapted to be filled with oil and serves as a reservoir to supply fluid by way of a common fluid passage 43 in the hitch block, to chambers 21″ underneath the pistons 23, by way of the branch passages 44, which connect the common passage with the said chambers. In this instance the check valves 45 are independent of the pistons and are in the form of flap valves. These valves are arranged to be opened upwardly by the suction of fluid caused by the upward movement of the pistons, thus permitting free passage of the fluid from the common supply passage into the chambers 42 underneath the pistons. In this manner it will be seen the pistons have free movement upwardly. Now as the pistons are moved downwardly by the recoil of the springs 16, the check valves are forced by the fluid underneath the pistons to a closed position or normal position as indicated. These valves are provided with openings 46, through which the fluid from underneath the pistons is forced back into the reservoir. Thus it will be seen the openings in the valves which are of a comparatively small area, causes the pistons to be moved downwardly to their normal position very slowly or with a retarded movement as in the former case, thus effectually checking the recoil of the springs. It is to be particularly noted, that with the provision of my improved shock absorbers, such springs may be used as will offer flexibility for a minimum as well as a maximum load, which provision at the present time is not accomplished. As an illustration of this fact, let us take for example in the case of light springs offering flexibility for a light load. In this case it is found that for a heavy load such light springs cause very objectionable teetering or rebounding, and in order to eliminate this objectionable feature it has become the common practice to provide heavier springs. Now it will be seen that the heavier springs will offer practically no flexibility for a minimum or average load, but with the provision of my improved shock absorber, such springs may be used as will offer flexibility for a minimum as well as a maximum load without the accompanying teetering or rebounding.

It is obvious that various other modifications in the details of construction and arrangement of parts might obviously be made by those skilled in the art without departing from the spirit and scope of my invention, and I wish therefore not to be limited to the precise construction and arrangement herein shown.

What I claim as new and desire to secure by Letters Patent of the United States is:

1. In an elevator, the combination with a car frame comprising a pair of parallel members forming the car cross-head, a hoisting cable, a wedge suspended by the hoisting cable, a spring interposed between the car frame and cable yieldingly to support the car, spring pressed members frictionally engaging the ends of the wedge, said members moving inwardly relatively to the wedge when the spring is compressed by the load and at the same time permitting free action of the load to compress the spring, said members being moved outwardly by the recoil action of the spring and at the same time yieldingly resisting said action of the spring, and members arranged transversely to the said parallel members and clamped thereto, forming top and bottom abutments to connect the spring pressed members to the car cross-head.

2. In an elevator, the combination with a car frame comprising a pair of parallel spaced channel irons forming the car cross-head, a hoisting cable, a wedge, a thimble rod connected to the cable and suspending the wedge, a coil spring yieldingly supporting the car frame, seated by the wedge, spring pressed members having inclined faces, frictionally engaging the ends of the wedge and having a tongue and groove connection therewith, said members moving inwardly relatively to the wedge when the spring is compressed by the load and at the same time permiting free action of the load to compress the spring, said members being moved outwardly relatively to the wedge, by the recoil action of the spring and at the said time yieldingly resisting said recoil action of the spring, and members arranged transversely to the said channel irons, clamped thereto, forming top and bottom abutments to connect the spring pressed members to the car cross head.

In testimony whereof I have signed my name to this specification in the presence of two subscribing witnesses.

JOHN H. BUCKLEY.

Witnesses:
 WALTER C. STRANG,
 JAMES G. BETHELL.

Copies of this patent may be obtained for five cents each, by addressing the "Commissioner of Patents, Washington, D. C."